Oct. 16, 1951  H. KONET  2,571,727
GYROSCOPE
Filed Dec. 1, 1949

INVENTOR.
HENRY KONET
BY
*S. H. Hartz*
ATTORNEY

Patented Oct. 16, 1951

2,571,727

UNITED STATES PATENT OFFICE 2,571,727

GYROSCOPE

Henry Konet, Hohokus, N. J., assignor to Bendix Aviation Corporation, Teterboro, N. J., a corporation of Delaware Application December 1, 1949, Serial No. 130,505

9 Claims. (Cl. 74—5.44)

1

The invention relates to gyroscopes for use on moving crafts and more particularly to an erecting system for a gyroscope to maintain a reference plane on the craft.

After substantial service, the bearings, providing for movement of the gimbal relative to the housing and the bearings providing for movement of the rotor case within the gimbal, wear and a substantial torque is required to precess the gyroscope to overcome bearing friction. If high precessing torques are exerted on the gyroscope, it is erected too rapidly and follows the dynamic vertical too closely. To avoid this difficulty, it is desirable to apply high instantaneous torques to overcome bearing friction, yet have a low average torque to extend the precessing over a reasonable period.

One object of the present invention is to provide novel structure for accurately maintaining the rotor spin axis of a gyroscope in a predetermined attitude.

Another object is to provide an erecting system which exerts high instantaneous precessing torques, and in which the torques are interrupted periodically so that their average value is low.

Another object is to supply substantially large pulsing torques for precessing the gyroscope so that the average value of the torques is relatively low.

The invention contemplates a novel erecting system for a gyroscope having gravity responsive means controlling a torque exerting means to cause the rotor axis to precess to a predetermined attitude when the rotor axis departs therefrom and the gravity responsive means departs from a neutral position. Means is provided to move the gravity responsive means periodically to neutral position so that a pulsing torque is exerted on the gyroscope.

The foregoing and other objects and advantages of the invention will appear more fully hereinafter from a consideration of the detailed description which follows, taken together with the accompanying drawing wherein one embodiment of the invention is illustrated. It is to be expressly understood, however, that the drawing is for the purpose of illustration and description only, and is not to be construed as defining the limits of the invention.

2 the gravity responsive device for detecting the vertical; and

Figure 3:
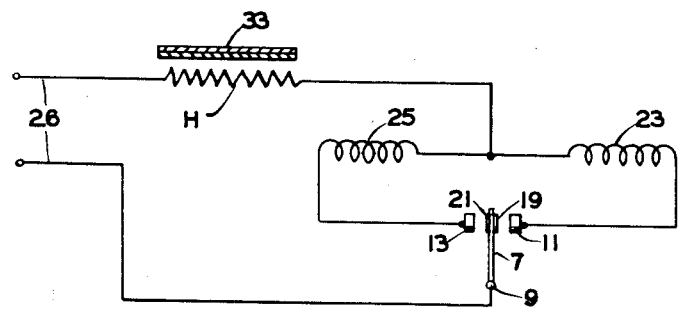

Figure 3 is a wiring diagram of the erecting system.

Referring now to the drawing for a more detailed description of the novel erecting system of the present invention, a vertical gyroscope G includes a rotor 1 spinning about a vertical axis Z within a rotor case 3. A gimbal 5 mounts rotor case 3 for rotation about a pitch axis X extending transversely of the craft and is mounted by trunnions 6 for rotation about a bank axis Y extending longitudinally of the craft.

An inverted pendulum 7 swings on rotor case 3 about a horizontal pivot 9 extending parallel to bank axis Y. The pendulum swings on its pivot between spaced contacts 11, 13 secured to resilient brackets 15, 17, respectively, on rotor case 3 and mounts a pair of contacts 19, 21 cooperating with contacts 11, 13. A pair of solenoids 23, 25 are mounted on rotor case 3 with their axes aligned with one another and intersecting vertical axis Z and extending parallel to pivot 9. A weighted plunger 27 is coaxial with the solenoids and is centered about the spin axis, when solenoids 23, 25 are de-energized, by a spring 29 having one end connected to plunger 27 and the other end secured to a bracket 31 on rotor case 3. Plunger 27 is attracted by one or the other solenoid 23, 25 when the solenoid is energized and unbalances the gyroscope to exert an erecting torque on the gyroscope about the X axis.

Solenoids 23 and 25 are connected in parallel with one another and through a heater H (for the purpose described hereinafter) to one terminal of a power source 26. Solenoid 23 is connected to contact 11 and solenoid 25 is connected to contact 13.

Pendulum 7 is connected to the other terminal of the power source and when the spin axis departs from the vertical and contact 19 or 21 engages the associated contact 11 or 13, the associated solenoid 23 or 25 is energized and attracts weighted plunger 27 toward it, and unbalances the gyroscope so that a torque is exerted in a direction to erect the gyroscope to vertical position about the Y axis. Spring 29 moves plunger 27 to center position when both of the solenoids are de-energized so that no erecting torque is exerted on the gyroscope.

Contacts 19, 21 of pendulum 7 are periodically disengaged from both contacts 11, 13 by a horizontally disposed bimetallic element 33 heated by heater H and secured at one end to a post 35 fixed to rotor case 3 and having its opposite end engaging a pin 37 on pendulum 7.

Figure 1:
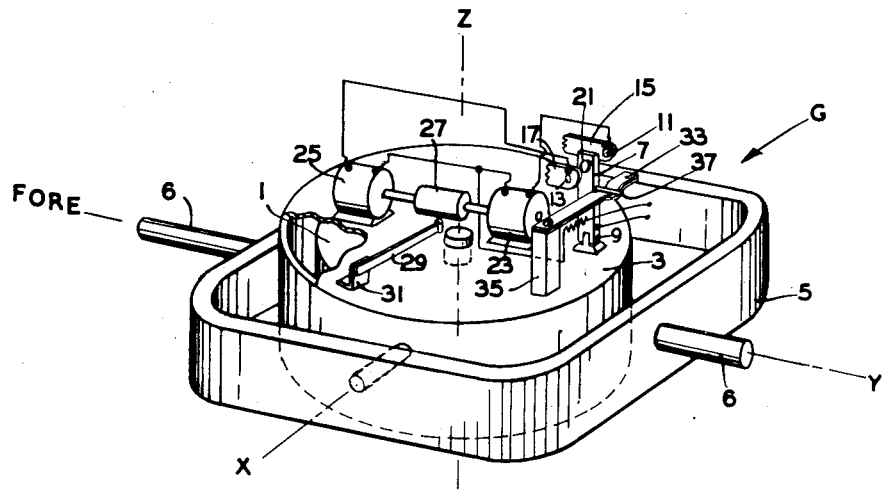
Figure 1 is a perspective view of a gyroscope having a novel erecting system constructed according to the invention.
Figure 2:
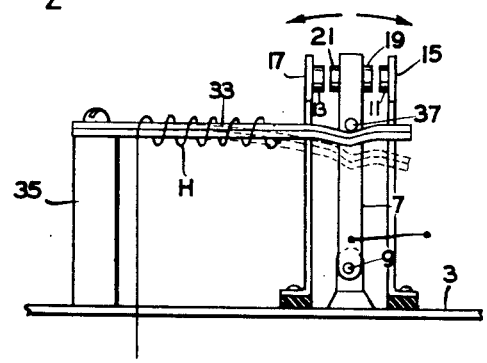
Figure 2 is a detail view of a portion of the gyroscope drawn to enlarged scale and showing

The bimetallic element flexes upon heating to the position shown in solid lines in Figure 2 and centers the pendulum to disengage both contacts 19, 21 from contacts 11, 13, whereupon the heater is disconnected from power source 26 and the bimetallic element cools and flexes to the broken line position shown in Figure 2. The pendulum is released and swings on its pivot, when the rotor axis is inclined to the vertical, so that one or the other pendulum contact 19, 21 again engages the associated contact 11, 13 and energizes the associated solenoid 19, 21.

With this arrangement, the weight is shifted periodically from a neutral or balanced position to an unbalanced position, and a pulsing erecting torque is exerted on the gyroscope so that high instantaneous torques may be applied to overcome bearing friction, yet provide a low average torque to extend the precession over a reasonable period so that the gyroscope is not erected too rapidly and will not follow the dynamic vertical too closely.

The gyroscope may be erected to the vertical about the X axis by an erecting system of the kind described positioned with the pendulum pivot and solenoid and plunger axes extending parallel to the X axis. The erecting system may be mounted on the lower side of the case with the pendulum pivot spaced from the case so that the pendulum is inverted.

Although but one embodiment of the invention has been illustrated and described in detail, it is to be expressly understood that the invention is not limited thereto. Various changes can be made in the design and arrangement of the parts without departing from the spirit and scope of the invention as the same will now be understood by those skilled in the art.

What is claimed is:

1. In a gyroscope, a rotor, a support rotatably supporting said rotor for spinning about an axis having a predetermined attitude, means for mounting said support for rotation about mutually perpendicular axes at an angle to said spin axis, means for creating an erecting torque on said rotor, a gravity responsive device, means responsive to said device for actuating said torque creating means to precess the gyroscope in a direction to bring the spin axis to said predetermined attitude, and means for periodically moving said gravity responsive device to a position to interrupt actuation of said torque creating means and the erecting torque.

2. Structure as described in claim 1 in which the last named means includes a bimetallic element periodically heated and flexed to move the gravity responsive device.

3. In a gyroscope, a rotor spinning about an axis having a predetermined attitude, a support rotatably supporting said rotor, means for mounting said support for rotation about mutually perpendicular axes at an angle to said spin axis, a weighted plunger, a pair of axially aligned solenoids attracting said plunger when energized to create an erecting torque, means to control energization of said solenoids, and means to periodically interrupt energization of said solenoids to interrupt the erecting torque.

4. In a gyroscope, a rotor, a support rotatably supporting said rotor and mounted for rotation about mutually perpendicular axes, a pair of axially aligned solenoids, a weighted plunger coaxial with said solenoids and extending therebetween, means to move said plunger to balanced position between said solenoids, said solenoids attracting said plunger when energized to provide an erecting torque, gravity responsive means to control energization of said solenoids, and means to periodically interrupt energization of said solenoids to interrupt the erecting torque.

5. In a gyroscope, a rotor, a support rotatably supporting said rotor and mounted for rotation about mutually perpendicular axes, a pair of solenoids mounted on said support, a weighted plunger associated with said solenoids and attracted to one or the other of said solenoids when the solenoid is energized to exert an erecting torque on the gyroscope, a spring moving said weighted plunger to balanced position when said solenoids are de-energized, an inverted pendulum for controlling energization of said solenoids, and means associated with said pendulum to periodically move said pendulum to a position to de-energize said solenoids to interrupt the erecting torque.

6. In a gyroscope, a rotor having a vertical spin axis, a support rotatably supporting said rotor, means for mounting said support for rotation about mutually perpendicular axes at right angles to said spin axis, an inverted pendulum mounted on said support by a pivot having its axis extending parallel to one of said mutually perpendicular axes, means for creating torque about an axis extending at right angles to said spin axis and at right angles to the pendulum pivot axis, means responsive to said inverted pendulum for actuating said torque creating means to precess the gyroscope in a direction to bring said spin axis to the vertical, and means for periodically interrupting the erecting torque.

7. In a gyroscope, a rotor, a support rotatably supporting said rotor and mounted for rotation about mutually perpendicular axes, a pair of contacts mounted on said support, an inverted pendulum pivoted to said support to engage one or the other of said contacts, a solenoid connected to each of said contacts and operating when the pendulum engages the associated contact, a weighted plunger associated with said solenoids, a spring for centering said weighted plunger between said solenoids so that the gyroscope is balanced, said plunger being attracted by said solenoids when said solenoids are energized to unbalance the gyroscope and exert an erecting torque thereon, and a bimetallic element adapted to flex periodically and disengage said pendulum from said contacts to de-energize said solenoid and release said plunger.

8. In a gyroscope, a rotor spinning about an axis having a predetermined attitude, a support rotatably supporting said rotor, means for mounting said support for rotation about mutually perpendicular axes at an angle to said spin axis, an inverted pendulum supported by a pivot having its axis extending parallel to one of said mutually perpendicular axes, a pair of contacts to limit movement of said pendulum, means for creating torque about an axis extending at right angles to said spin axis and at right angles to the pendulum pivot axis, means energized by said pendulum when said pendulum engages one of said contacts for actuating said torque creating means to precess the gyroscope in a direction to bring said spin axis to the predetermined attitude, and means for periodically moving said pendulum to a position substantially midway between said contacts to interrupt the erecting torque.

9. In a gyroscope, a rotor adapted to spin about an axis having a predetermined attitude, a support rotatably supporting said rotor and mounted for rotation about mutually perpendicular axes at an angle to the spin axis, gravity responsive means for detecting departure of the spin axis from the predetermined attitude, means mounted on said support controlled by said gravity responsive means, a mass associated with said controlled means and movable by said controlled means to a position to exert an erecting torque on the gyroscope, means for moving said mass to balanced position when said controlled means is inoperative, and means associated with said gravity responsive means to periodically move said gravity responsive means to a position to render inoperative said means controlled thereby to interrupt the erecting torque.

HENRY KONET.

REFERENCES CITED

The following references are of record in the file of this patent:

UNITED STATES PATENTS

| Number | Name | Date |
|---|---|---|
| 1,763,806 | Methvin | June 17, 1930 |
| 2,315,501 | Crane et al. | Apr. 6, 1943 |
| 2,462,541 | Norden | Feb. 22, 1949 |
| 2,499,238 | Wehrlin | Feb. 28, 1950 |